April 16, 1935.  A. A. STILL  1,998,208
SAFETY LATCH FOR AUTOMOBILE GEAR SHIFT LEVERS
Filed March 12, 1934
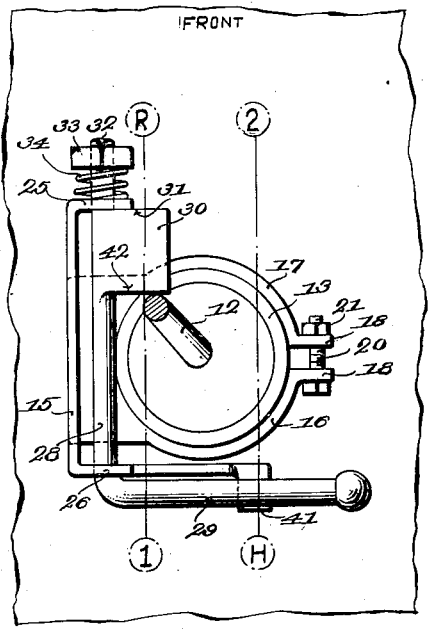
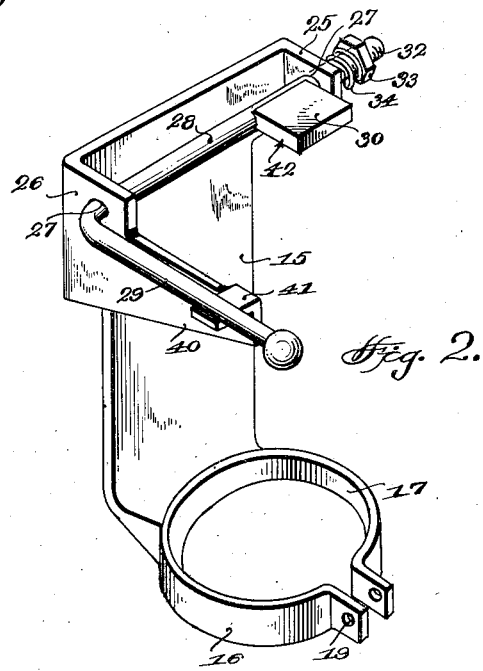
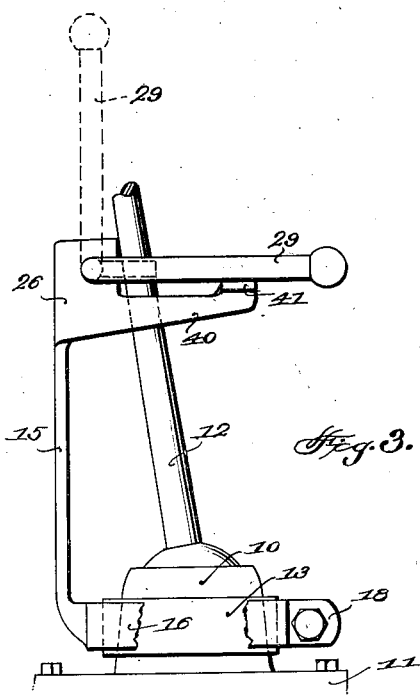
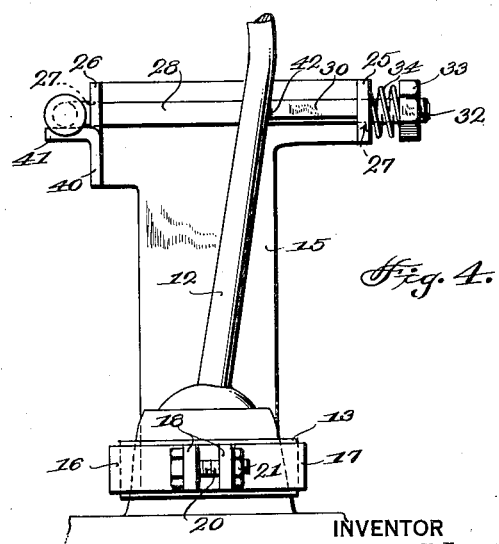
INVENTOR
Abram A. Still
BY
ATTORNEY Patented Apr. 16, 1935

1,998,208

UNITED STATES PATENT OFFICE 1,998,208

SAFETY LATCH FOR AUTOMOBILE GEAR SHIFT LEVERS

Abram Allen Still, Annette, Calif.

Application March 12, 1934, Serial No. 715,224

4 Claims. (Cl. 74—476)

This invention relates to a safety latch for automobile gear shift levers.

In the standard type of gear shift levers, the lever is moved rearwardly and towards the driver from a neutral position for low speed. The lever is moved for an intermediate speed forwardly to the neutral position, then to the right, and then forwardly. A high speed is obtained by moving the gear shift lever in a line directly rearwardly. If it be desired to provide for a reverse speed, the lever must be moved to the neutral position from any of the positions stated above and then shifted through the neutral position to the left adjacent the driver and then forwardly.

In a certain type of automobile the low speed position of the gear shift lever is directly opposite to that of the standard low position and at a point where the reverse speed position of the standard type is located. In changing from the standard type to the special type of gear shift levers just mentioned, and vice versa, it sometimes happened that the operator unconsciously moved the gear shift lever to the reverse position instead of the low speed position or moved the gear shift lever to the low speed position instead of the reverse position. This incorrect movement of the gear shift lever is the cause of considerable accidents.

Even in the standard gear shift lever the operator occasionally moves the lever past the neutral position into the reverse when such position is not intended.

It is an object of the invention to provide a safety latch for gear shift levers which will prevent the operator from moving the gear shift lever to reverse position unless he removed the latch to an inoperative position to permit the proper positioning of the lever for reversing the car.

An object of the invention is the provision of a safety latch for gear shift levers which will normally be maintained in position to prevent the gear shift lever from being moved to the reverse position with means for maintaining the latch normally in an operative position or an inoperative position, means being employed in connection with the latch mechanism for conveniently releasing the latch and causing the same to be moved to an inoperative position.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a plan view of a safety latch mechanism constructed in accordance with the principles of my invention, Figure 2 is a view in perspective of the latch mechanism showing its detachability as a unit from the car, Figure 3 is an end view in elevation of the same, and Figure 4 is a side view in elevation of the unit.

Referring more particularly to the drawing, 10 designates a housing forming an auxiliary part of a transmission casing 11. A gear shift lever 12 projects from the housing 10 and may be oscillated through definite positions describing the letter H for moving said lever from a neutral position to first and second speeds and to high speed or the lever may be moved from any of these positions to the reverse position.

A metal ring 13 is welded or secured in any approved manner to the outer surface of the housing 10 and the ring may be formed integrally with the housing.

A bracket in the form of a metal plate 15 rises from the housing at one side of the gear shift lever 12 and has at its lower end a pair of jaws or arms 16 and 17. These arms or jaws are curved to conform to the curvature of the ring 13 and are adapted to embrace said ring. Lugs 18 project laterally from the free ends of the arms and are provided with passages 19 to receive a headed bolt 20 so that when a nut 21 is threaded on to the end of the bolt the arms 16 and 17 will be drawn up tight in clamping engagement with the ring 13 for securely fastening the bracket 15 on to the housing 10.

The side edges of the plate 15 are provided with a pair of inturned flanges 25 and 26. These flanges are provided with openings 27 forming bearings for a shaft 28. The flanges are located in parallel relation and project forwardly of the plate 15.

An operating arm 29 projects at right angles from one end of the shaft and is adapted to be normally positioned horizontally when the shaft 28 and a latch member or block 30 are disposed in an operative position. The latch member is secured to the other end of the shaft 28 in any approved manner and has one edge 31 in contact with the flange 25.

The outer end of the shaft 28 is threaded, as shown at 32, to receive a nut 33. A coil spring 34 embraces the shaft between the nut 33 and the flange 25 and exerts a pull on the shaft to provide a frictional resistance for the turning of the shaft.

The flange 26 is provided with an extension 40 having a laterally disposed lug 41 upon which the arm 29 is adapted to normally rest in a horizontal position.

The latch member 30 is provided with a straight edge 42 at one end to engage the lever 12 and to prevent said lever from being moved to the reverse position while the arm 29 and latch member 30 are located in a horizontal position, as shown more particularly in Fig. 4.

The operation of my device is as follows: During the operation of the car the lever 29 is moved to the horizontal position with the arm resting upon the laterally disposed lug 41. Thus it will be seen that the latch member or block 30 which is connected to the rock shaft 28 will also be disposed in a horizontal position and across the path of the movement of the arm towards the reverse position as shown in Figs. 1 and 4. Thus the block member will at all times prevent the shift lever from being moved to the reverse position accidentally. If it be desired to move the gear shift lever to the reverse position it is only necessary for the operator to move the arm 29 upwardly and to a vertical position as shown in dotted lines in Fig. 3 whence the latch member 30 will be moved to a vertical position out of the path of the movement of the lever and thus permit the operator to move the lever to the reverse position indicated in Fig. 1.

It will be noted that the arm 29 extends sufficiently beyond the lug 41 to permit the operator to conveniently raise the arm without any interference from the extension 40 on the bracket 15.

The spring member 34 will exert a pull on the shaft 28 at all times so that the frictional resistance exerted by the shaft 28 and the latch member 30 on the adjacent parts will be sufficient to maintain the lever in any of its adjusted positions, particularly when the latch member 30 and the arm 29 have been moved to a vertical position.

The device is made as a unit so that it may be quickly applied to the housing 10 or the unit may be readily removed when desired.

It will be appreciated that while I have illustrated the locking device as applied to one form of gear shifting lever the locking device may be applied to any type now in use or to those types which were accepted as standard in certain makes of automobiles.

I claim:

1. A safety latch for an automobile gear shift lever comprising a housing, an annular ring secured to the housing, a bracket, a pair of curved clamping jaws connected to the lower end of the bracket and embracing the ring, means on the free end of the jaws for clamping the jaws on to the ring, bearings formed on the upper end of said bracket, a rod rockably mounted in the bearings, a latch member formed integrally with the rod and projecting at a right angle from one end of said rod and into the path of the reverse movement of the gear shift lever, a spring for causing frictional resistance to the rotation of the rod and latch member for aiding in retaining the latch member in an adjusted position, and means for rocking the rod and for moving the latch member to an inoperative position.

2. A safety latch for an automobile gear shift lever comprising a housing for one end of a gear shift lever, said housing being provided with a ring, a bracket, means on the lower end of the bracket for clamping the bracket on the ring and for supporting said bracket in a fixed position, bearings at the upper end of the bracket, a shaft rockably mounted in the bearings, a block on the shaft and forming a latch member for normally preventing the gear shift lever from being moved to the reverse position, the shaft being provided with a right angular portion for rocking the block to an inoperative position, a keeper for supporting the right angular portion in an operative position to retain the block in the path of the gear shift lever for the reverse position, and means resisting rocking movement of the shaft for retaining the keeper in an adjusted position.

3. A safety latch for an automobile gear shift lever comprising a housing from which projects the gear shift lever, a bracket, cooperating means on the housing and bracket for removably connecting the bracket to the housing and for supporting one end of the bracket adjacent the gear shift lever, spaced bearings at the opposite end of the bracket, a shaft rockably mounted in said bearings, a block projecting radially from the shaft, one end of the block adapted to be disposed normally in the path of the gear shift lever when said lever is moved to the reverse position, means for rocking the shaft and for moving the block out of the path of said lever for reverse position, the other end of the block frictionally engaging one of the bearings for aiding in retaining the block in an adjusted position, and a spring acting on the shaft for maintaining the block in frictional engagement with said bearing.

4. A safety latch for an automobile gear shift lever comprising a bracket in the form of an elongated plate, means for clamping the lower end of the plate to a fixed support, spaced bearings provided at the upper end of said bracket, a shaft rockably mounted in the bearings, a block projecting from the shaft and located between the bearings, and having one end normally disposed across the path of movement of the gear shift lever to prevent said lever from being moved to the reverse position, and means for rocking the shaft for moving the block to an inoperative position, a spring on the shaft tending to move the shaft longitudinally for causing frictional resistance between the block and a bearing for aiding in retaining the latch member in an adjusted position.

ABRAM ALLEN STILL.